United States Patent [19]

Choy

[11] Patent Number: 5,293,381
[45] Date of Patent: Mar. 8, 1994

[54] BYTE TRACKING SYSTEM AND METHOD

[75] Inventor: Henry S.-F. Choy, Fremont, Calif.

[73] Assignee: Advanced Micro Devices, Sunnyvale, Calif.

[21] Appl. No.: 858,932

[22] Filed: Mar. 27, 1992

[51] Int. Cl.⁵ ............................................. H04J 3/00
[52] U.S. Cl. ........................................ 370/99; 370/85.1
[58] Field of Search ................. 370/99, 82, 83, 101, 370/105.1, 105.2, 43, 85.1, 85.13

[56] References Cited

U.S. PATENT DOCUMENTS

| | | | |
|---|---|---|---|
| 3,988,545 | 10/1976 | Kuemmerle et al. | 370/99 |
| 4,309,765 | 1/1982 | Mueller et al. | 370/99 |
| 4,974,225 | 11/1990 | Chenier et al. | 370/105.1 |
| 5,014,272 | 5/1991 | Yoshida | 370/105.1 |
| 5,020,055 | 5/1991 | May, Jr. | 370/85.1 |

FOREIGN PATENT DOCUMENTS 0290172 4/1988 European Pat. Off. .
0364720 9/1989 European Pat. Off. .
0388300 3/1990 European Pat. Off. .

*Primary Examiner*—Douglas W. Olms
*Assistant Examiner*—Shick Hom
*Attorney, Agent, or Firm*—Steven F. Caserza

[57] ABSTRACT

A byte tracking system (60) has a 32-bit wide system data bus (34). System bus interface unit (48) connects the system bus (34) to the transmit FIFO buffer memory (42) to supply 4-byte data words (62) to the FIFO buffer memory (42). The FIFO buffer memory (42) has word write and read accessibility. A 4:1 multiplexer (64) is connected at the output side of the FIFO buffer memory (42) by a 32-bit wide bus (66). The multiplexer (64) is used to multiplex correct bytes (63) from the data words (62) to an 8-bit output bus (68). A byte tracker circuit (70) controls the multiplexer (64) and determines which byte (63) is to be sent to the output bus (68). The bytes (63) supplied to output bus (68) are converted by a parallel to serial converter (69) to a serial bit stream, which is supplied to Manchester encoder/decoder (36).

5 Claims, 5 Drawing Sheets

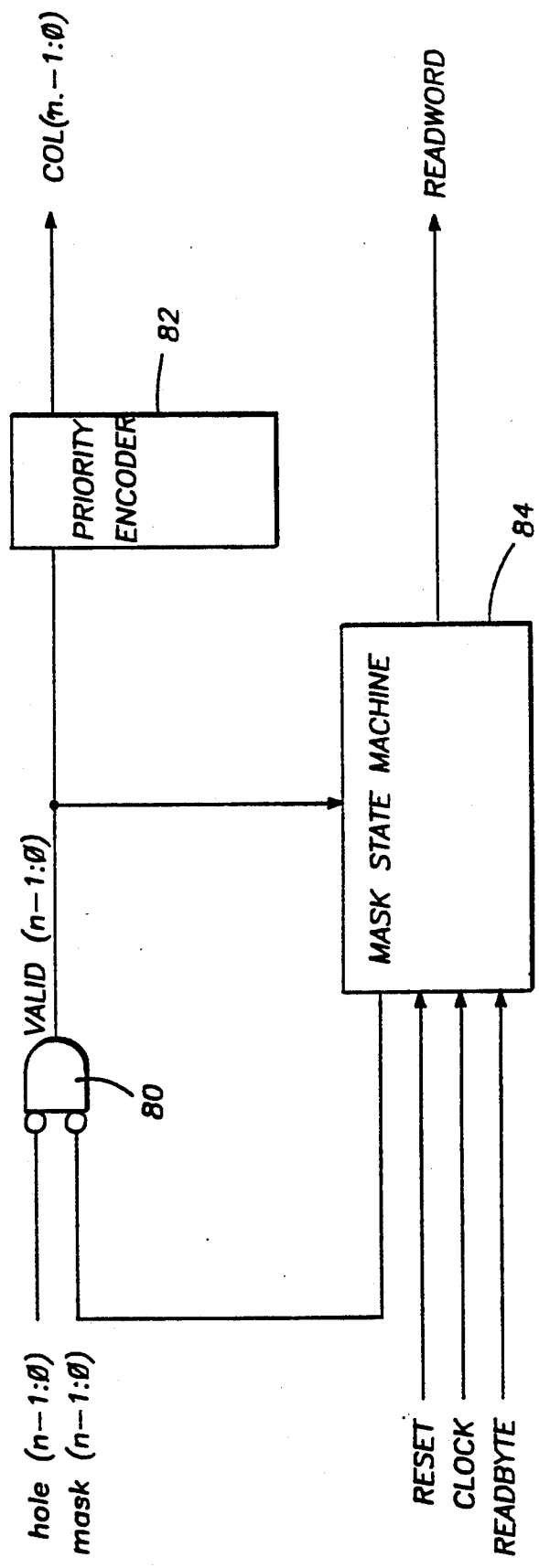

| CURRENT INPUTS | | | | | NEXT STATE | | | |
|---|---|---|---|---|---|---|---|---|
| VALID(3) | VALID(2) | VALID(1) | VALID(0) | LASTBYTE | MASK(3) | MASK(2) | MASK(1) | MASK(0) |
| 0 | 0 | 0 | 0 | 0 | 0 | 0 | 0 | 1 |
| 0 | 0 | 0 | 1 | 0 | 0 | 0 | 1 | 1 |
| 0 | 0 | 1 | 0 | 0 | 0 | 0 | 1 | 1 |
| 0 | 0 | 1 | 1 | 0 | 0 | 1 | 1 | 1 |
| 0 | 1 | 0 | 0 | 0 | 0 | 1 | 0 | 1 |
| 0 | 1 | 0 | 1 | 0 | 0 | 1 | 1 | 1 |
| 0 | 1 | 1 | 0 | 1 | 0 | 0 | 0 | 0 |
| 1 | 0 | 0 | 1 | 0 | 0 | 0 | 0 | 1 |
| 1 | 0 | 1 | 0 | 0 | 0 | 0 | 1 | 1 |
| 1 | 0 | 0 | 1 | 1 | 1 | 0 | 0 | 1 |
| 1 | 1 | 0 | 0 | 0 | 1 | 1 | 0 | 0 |
| 1 | 1 | 0 | 1 | 1 | 0 | 1 | 0 | 0 |
| 1 | 1 | 1 | 0 | 1 | 0 | 0 | 0 | 0 |
| 1 | 1 | 1 | 1 | 1 | 0 | 0 | 0 | 0 |

FIG. -6

BYTE TRACKING SYSTEM AND METHOD

BACKGROUND OF THE INVENTION

1. Field of the Invention

The present invention relates generally to a system and method for transferring data between two data busses having different widths. More particularly, it relates to such a system and method including a digital storage buffer designed to interface the two data busses, where information is passed to the buffer sequentially from one bus and retrieved from the buffer sequentially to the other bus. Most especially, the invention relates to such a system and method including a logic circuit to interface a first data bus to a second data bus, the second data bus having a size equal to an integral fraction of the first data bus, through a First-In-First-Out (FIFO) buffer memory.

2. Description of the Prior Art

In such systems data presented from the wider bus may contain a full word, which represents the full width of the bus, or a partial word, which means that only part of the bus has valid data associated with it. The interface must recognize the invalid data in the partial word and must not pass the invalid data to the second bus.

It is known to use a perfect data aligner to recognize and eliminate the invalid data before passing the aligned data to the FIFO memory buffer. The data aligner typically consists of a multiplexer which packs data to eliminate the invalid data fields. A temporary holding register is used to store data during the packing process. Any part of a word not written to the FIFO buffer memory immediately has to be stored in the temporary holding register, and any subsequent word has to be aligned with these stored data. The resulting logic requires a substantial amount of control logic, which is a speed limitation for a high speed bus interface.

SUMMARY OF THE INVENTION

Accordingly, it is an object of this invention to eliminate the need for a perfect aligner in a system and method for transferring data between two data busses having different bus widths.

It is another object of the invention to provide such a system and method in which speed limitations introduced by control logic for a perfect aligner are avoided.

The present invention circumvents the limitations of perfect data aligners and their control logic by eliminating the need for a perfect aligner. The data word, full or partial, is written in its entirety to the FIFO buffer memory, with invalid data marked as holes in an associated hole register. A byte tracker is installed at the output end of the FIFO buffer memory, where the invalid data is skipped while the data is being read out of the buffer.

The attainment of these and related objects may be achieved through use of the novel byte tracking system and method herein disclosed. A byte tracking system in accordance with this invention transfers data in multiple byte words between a first bus and a second bus having different widths. A system interface is connected to the first bus. A first-in-first-out buffer memory has an input connected to the system interface by a system interface bus with a width corresponding to the first bus. The first-in-first-out buffer memory is configured to store each multiple byte word in a multiple byte data field with an associated multiple bit byte validity field. The first-in-first-out buffer memory has an output connected by a buffer memory output bus with a width corresponding to the first bus. The buffer memory output bus is connected to a multiplexer. The multiplexer is connected to the second bus, and a byte tracker is connected to the byte validity fields of the first-in-first-out buffer memory and to the multiplexer to control operation of the multiplexer to provide valid bytes from the first-in-first-out buffer memory to the second bus.

A byte tracking method in accordance with this invention transfers data in multiple byte words between a first bus and a second bus having different widths. The multiple byte words are stored in a first-in-first-out buffer memory. Associated multiple bit byte validity data for each of the multiple byte words is stored in the first-in-first-out buffer memory. The multiple byte words are supplied to a multiplexer. Which bytes of the multiple byte words contain valid data is determined using the multiple bit byte validity data. The valid bytes are supplied from the multiple byte words to the second bus from the multiplexer.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 3 is a representative data format used in the system of FIG. 1.

FIG. 4 is a more detailed block diagram of part of the system portion shown in FIG. 3.

FIG. 6 is a truth table for the mask state machine 84 shown in FIG. 4.

DETAILED DESCRIPTION OF THE INVENTION

Figure 1:
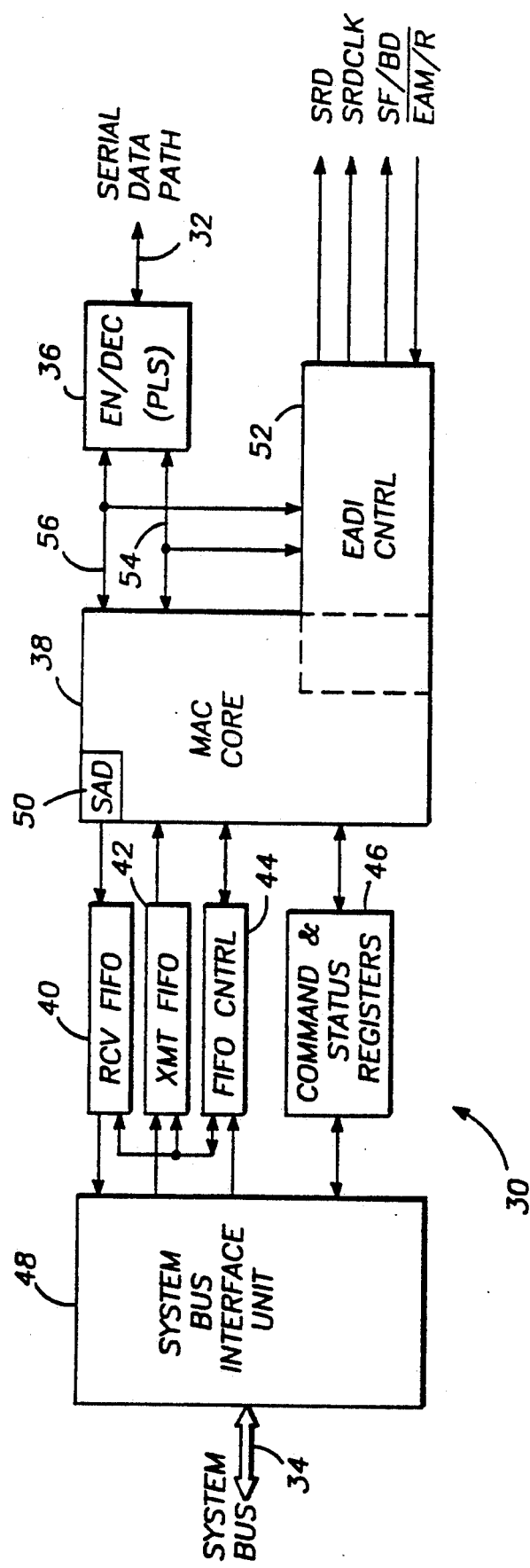
FIG. 1 is a block diagram of a system in accordance with the invention.

Turning now to the drawings, more particularly to FIG. 1, there is shown a media access controller (MAC) 30 used as an interface in an Ethernet data processing network. The MAC 30 controls the passage of information between a shared Ethernet serial data path 32 and a system bus 34. The MAC 30 includes a Manchester encoder/decoder 36 and a MAC core 38, which in the preferred embodiment, is implemented in accordance with the IEEE 802.3 standard. The MAC 30 also includes a receive FIFO 40, a transmit FIFO 42 and FIFO control logic 44 as well as command and control registers 46. A system bus interface unit 48 is logically disposed between the receive and transmit FIFOs 40 and 42 and the system bus 34. The MAC core 38 includes a station address detect (SAD) unit 50 which determines whether packets received by the MAC 30 in fact are addressed to it and should be captured in their entirety, or are addressed to a different MAC station (not shown) and should be rejected. The byte tracking system of this invention is incorporated in the system bus interface unit 48, transmit FIFO 42, MAC core 38 and Manchester encoder/decoder 36 of the MAC 30. Further background information on the Ethernet data processing network and the MAC 30 are provided in commonly owned Crayford, application Ser. No.

07/841113, filed Feb. 24, 1992 and entitled, "Ethernet Media Access Controller with External Address Detection Interface and Associated Method," the disclosure of which is incorporated by reference herein.

Figure 2:
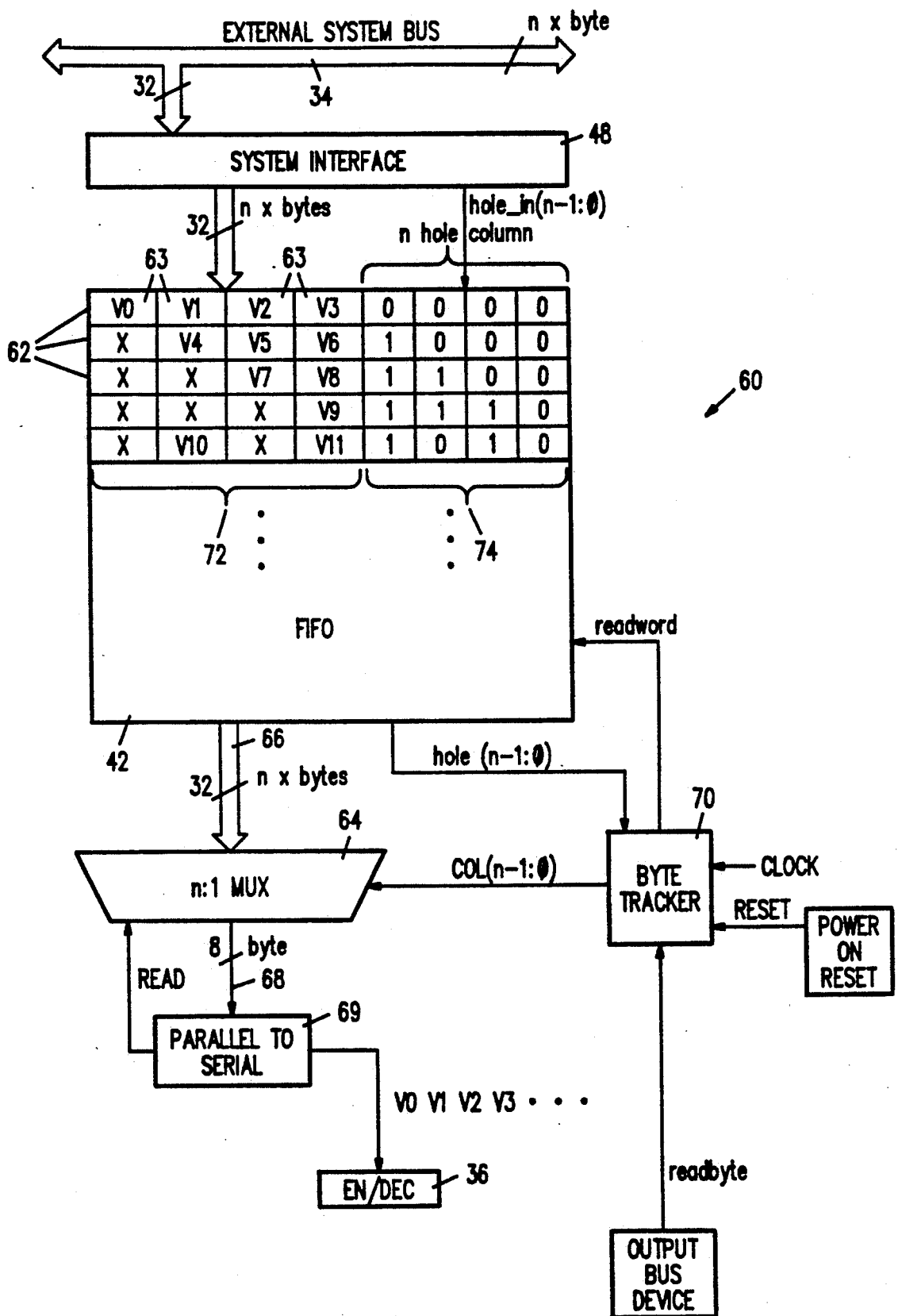
FIG. 2 is a functional block diagram of a portion of the system of FIG. 1.

Details of byte tracking system 60 are shown in FIG. 2. System bus 34 is a 32-bit wide data bus. System bus interface unit 48 connects the system bus 34 to the transmit FIFO buffer memory 42 to supply 4-byte data words 62 to the FIFO buffer memory 42, where each of the four bytes are 8-bits in length. The FIFO buffer memory 42 has word write and read accessibility. A 4:1 multiplexer 64 is connected at the output side of the FIFO buffer memory 42 by a 32-bit wide bus 66. The multiplexer 64 is used to multiplex correct bytes 63 from the data words 62 to an 8-bit output bus 68. A byte tracker circuit 70 controls the multiplexer 64 and determines which byte 63 is to be sent to the output bus 68. If desired, the bytes 63 supplied to output bus 68 are converted by a parallel to serial converter 69 to a serial bit stream, which is supplied to Manchester encoder/decoder 36. Alternatively, the 8-bit output bytes can be used in parallel by external circuitry (not shown). The reset signal applied to a byte tracker 70 is made available whenever byte tracking system 60 is to be reset, for example upon power on reset, or in conjunction with external systems (not shown). In one embodiment, the reset signal is responsive to an externally supplied reset signal available on the integrated circuit package containing byte tracker circuit 60. The read byte signal applied to byte tracker 70 is made available from external circuitry (not shown) indicating when it is desired to receive the next output word on bus 68.

The FIFO buffer memory 42 has control logic (not shown) to implement the First-In-First-Out function. The system and method is independent of the depth of the FIFO buffer memory. Each line of the FIFO buffer memory 42 consists of a 4 byte data field 72 and a 4 bit hole field 74.

FIG. 3 shows a generalized format for the data as stored in the FIFO buffer memory 42. As shown, each multiple byte word consists of n data bytes n-1:0 (where n is 4 in the case of the exemplary system of FIGS. 1-2) and n bits of status tag called HOLE n-1:0. Each word is written entirely into the FIFO memory 42 during a write access. For each byte in the word, the write access logic portion of system interface 48 generates the corresponding HOLE bit to indicate the validity of the byte. System interface 48 generates the HOLE bits based upon signals from the system interface, for example with direct memory access (DMA) capability, which specifies which byte or bytes the memory system should present on the system bus by means of byte enable signals. See, for example, the AMD AM79C900 (Integrated Local Area Communication Controller for Ethernet) Data Sheet, published February, 1990. At the output side of the FIFO buffer memory 42, the entire word is read out and passed over to the multiplexer 64.

The byte tracker 70 determines which byte is to be passed to the data output bus 68 of the byte tracking system 60. For each word that is read from the FIFO buffer memory 42, the byte tracker scans the HOLE bits starting from the lowest order bit and searches for the first bit that is not set. The bit that is not set corresponds to the next valid byte that would be sent to the output of the system 60 when a byte is requested. After this byte is read out, the byte tracker 70 proceeds to search for the next valid byte by looking at the holes again, skipping the bits that are set or have already been scanned.

Figure 5:
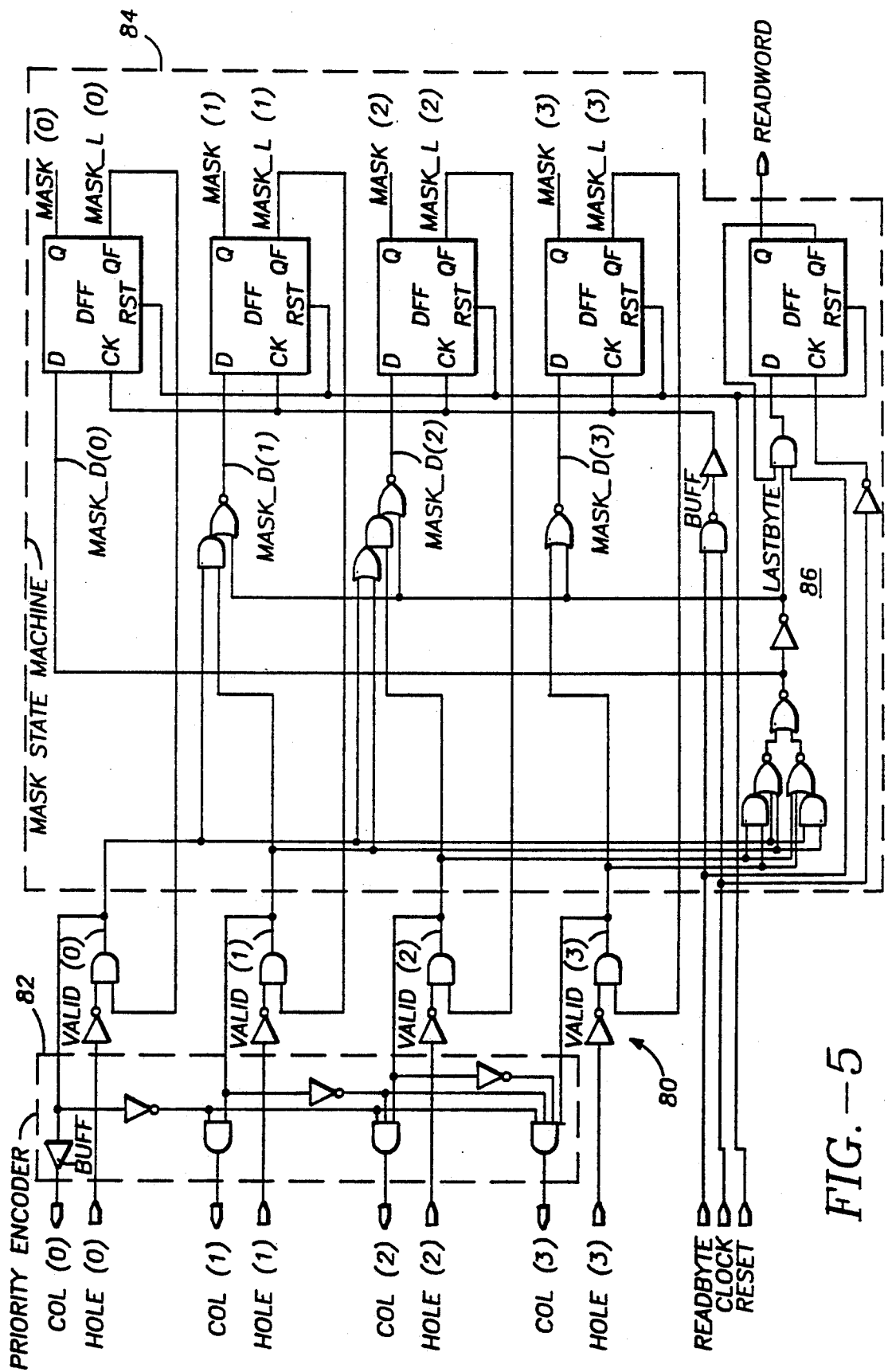
FIG. 5 is a circuit diagram corresponding to the part of the system portion shown in FIG. 4.

FIGS. 4 and 5 show details of the byte tracker 70. The byte tracker 70 scanning is implemented with three elements:

(1) Logic 80 determines the current valid bytes 63. It does so using the relationship, VALID(i)=not (HOLE(i)) and not (MASK(i)). VALID(n-1:0) indicates which of the n bytes of the word remain valid. The HOLE information provided in the status tag is filtered by the MASK, which is updated after every access. Any byte that has already been accessed would be masked to zero in the corresponding VALID field.

When HOLE is presented for each fresh word, none of the bytes 63 have been accessed, and the MASK is zero. VALID corresponds to all the bytes 63 not marked as holes. After each VALID is accessed, MASK is updated to exclude this current byte 63, and VALID would then indicate the location of the remaining valid bytes 63.

(2) A priority encoder 82 with VALID(n-1:0) as its input and COL(n-1:0) as its output. The priority encoder 82 determines which of the valid bytes 63 is to be sent out to the output of the multiplexer 64. VALID indicates the location of all the remaining valid bytes in the word. COL is a column select signal that is sent out to the multiplexer 64, and the corresponding byte 63 will be multiplexed to the output. Only one of the n COL lines will be asserted any time. The priority encoder 82 will assert the COL line corresponding to the least significant bit of VALID(n-1:0).

(3) A mask state machine 84. The input to the mask state machine 84 includes:
 a) a RESET signal, which resets the MASK(n-1:0) to all zero, implying none of the hole bits would be masked in the beginning.
 b) a READBYTE request signal, which tells the byte tracker 70 to output a byte 63;
 c) VALID(n-1:0) signals, which are the primary inputs to the state machine 84, and will determine the next MASK value;
 d) a CLOCK signal.

The output of the state machine 84 includes:
 a) a MASK(n-1:0) signal, which is used to mask out the invalid bytes 63 and the bytes 63 that have already been sent out in prior accesses;
 b) a READWORD signal, which signals the FIFO buffer memory 42 to access the next word 62.

The mask state machine 84 accepts the VALID(n-1:0) signals as primary inputs. The next state of the MASK signal is determined by flipping the least significant 0-bit of VALID(n-1:0) to a one, unless LASTBYTE is indicated.

LASTBYTE detection logic 86 determines if there is only one valid byte 63 left, which is indicated by a single zero in VALID(n-1:0), and the next state of the MASK signal is all zero. READWORD is also asserted to signal the FIFO buffer memory 42 to access the next word.

FIG. 6 is a truth table for the mask state machine 84. The truth table incorporates the above rules for the state machine 84.

The operation of the system 60 can be further understood by examining the five lines 62 of data in the FIFO buffer memory 42. In the first line 62, all four bytes V0–V3 in the data field 72 are valid, as shown by the four zeros in the hole field 74. In the second line 62, the first byte is invalid data, as indicated by the one in the first bit of the hole field 74, and the remaining bytes V4-V6 are valid as indicated by the zeros in the second through fourth bits of the hole field. Similarly, the first two bytes of the third line 62 contain invalid data, the first three bytes of the fourth line 62 contain invalid data, and the first and third bytes of the fifth line contain invalid data. As a result of operation of the multiplexer 64 and the byte tracker 70, the valid bytes are provided as a sequential output V0 ... VN with no interruption by the invalid bytes.

It should further be apparent to those skilled in the art that various changes in form and details of the invention as shown and described may be made. It is intended that such changes be included within the spirit and scope of the claims appended hereto.

What is claimed is:

1. A system for transferring data in multiple byte words between a first bus and a second bus having different widths, which comprises a system interface connected to said first bus, a first-in-first-out buffer memory having an input connected to said system interface by a system interface bus having a width corresponding to said first bus, said first-in-first-out buffer memory being configured to store each multiple byte word in a multiple byte data field with an associated multiple bit byte validity field, said first-in-first-out buffer memory having an output connected by a buffer memory output bus having a width corresponding to said first bus, said buffer memory output bus being connected to a multiplexer, said multiplexer being connected to said second bus, and a byte tracker connected to the byte validity fields of said first-in-first-out buffer memory and to said multiplexer to control operation of said multiplexer to provide valid bytes from said first-in-first-out buffer memory to said second bus.

2. The system of claim 1 additionally comprising a parallel to serial converter connected to said second bus to provide the valid bytes as a serial bit stream.

3. The system of claim 1 in which said byte tracker comprises logic for determining valid bytes, a mask state machine connected to said logic for determining valid bytes, and a priority encoder connected to said logic for determining valid bytes.

4. A method for transferring data in multiple byte words between a first bus and a second bus having different widths, which comprises storing the multiple byte words in a first-in-first-out buffer memory, storing associated multiple bit byte validity data for each of the multiple byte words in the first-in-first-out buffer memory, supplying the multiple byte words to a multiplexer, determining which bytes of the multiple byte words contain valid data using the multiple bit byte validity data, and supplying the valid bytes from the multiple byte words to the second bus from the multiplexer.

5. The method of claim 4 additionally comprising converting the valid bytes supplied to the second bus from a parallel data stream to a serial bit stream.

* * * * *